United States Patent
Hofmann

(10) Patent No.: US 6,723,163 B1
(45) Date of Patent: Apr. 20, 2004

(54) CONCRETE ADMIXTURE

(75) Inventor: Thomas Hofmann, Niederweningen (CH)

(73) Assignee: MBT Holding AG, Zurich (CH)

( * ) Notice: Subject to any disclaimer, the term of this patent is extended or adjusted under 35 U.S.C. 154(b) by 49 days.

(21) Appl. No.: 09/763,482

(22) PCT Filed: May 29, 2000

(86) PCT No.: PCT/EP00/04909

§ 371 (c)(1),
(2), (4) Date: Sep. 25, 2001

(87) PCT Pub. No.: WO00/78688

PCT Pub. Date: Dec. 28, 2000

(30) Foreign Application Priority Data

Jun. 18, 1999 (EP) .............................. 99201963

(51) Int. Cl.⁷ .............................. C04B 24/12
(52) U.S. Cl. .................. 106/727; 106/808; 106/819; 106/823; 427/427
(58) Field of Search ................. 106/727, 808, 106/819, 823; 427/427

(56) References Cited

U.S. PATENT DOCUMENTS 5,997,630 A * 12/1999 Angelskar et al. .......... 106/696
6,302,954 B1 * 10/2001 Lunkenheimer et al. .... 106/727

FOREIGN PATENT DOCUMENTS

| DE | 266 344 A1 | 3/1989 |
| EP | 0 812 812 A1 | 12/1997 |
| FR | 2.031.950 | 11/1970 |
| GB | 2 307 475 A | 5/1997 |
| WO | WO96/05150 | 2/1996 |
| WO | WO98/18740 | 5/1998 |

* cited by examiner

*Primary Examiner*—Paul Marcantoni
(74) *Attorney, Agent, or Firm*—Norris McLaughlin & Marcus, PA

(57) ABSTRACT

An accelerating admixture for sprayed concrete comprises: (a) the reaction product of aluminium hydroxide with an organic acid; (b) aluminium sulphate; and (c) at least one alkanolamine. Concrete to which accelerator has been added sets rapidly.

12 Claims, No Drawings

CONCRETE ADMIXTURE

This invention relates to cementitious compositions and to accelerating admixtures for use therein, especially as shotcrete accelerators.

Sprayed concrete or "shotcrete", which is applied to substrates such as rock faces and tunnels by spraying must set very rapidly. In such a use, the traditional concrete accelerators such as calcium chloride are not effective, and more powerful accelerators must be used, including sodium aluminate and alkali metal hydroxides. These are highly alkaline, which gives rise both to handling difficulties and unpleasant conditions when spraying in confined spaces such as tunnels.

An alternative accelerating technology based on aluminium compounds has been known for some time. The use of aluminium hydroxide either alone or combined with other materials is described in, for example, Japanese Kokai S51-144425 and European Patent 0 076 927.

In a variation on this, aluminium hydroxide may be partially reacted with an acid, preferably an organic acid—see, for example GDR Patent DD 226 344, British Patent GB2 307 475 and European Application 0 798 300.

Aluminium sulphate is also known as a component of accelerating systems, and is described in, for example, Japanese Kokais S50-143816, S58-99147 and S63-291839, and European Patent Application 0 812 812. Another aluminium compound which has been used in concrete accelerators is basic aluminium sulphate (also known as aluminium hydroxysulphate)—see, for example, European Patents 0 711 260 and 0 775 097.

It has now been found that a particularly effective accelerating admixture can be prepared by a combination of particular components. There is therefore provided, according to the present invention, an accelerating admixture for sprayed concrete, comprising (a) the reaction product of aluminium hydroxide with an organic acid;

(b) aluminium sulphate; and (c) at least one alkanolamine.

Reaction products of aluminium hydroxide and organic acids are known to the art, and are described in, for example, the abovementioned DD 226 344 and GB 2 307 475. The products have the formula $Al(OH)_{3-x}R_x$, where R is an anion of an organic acid. The acid is preferably a carboxylic acid, more preferably a lower ($C_1$–$C_6$) alkanoic acid and most preferably either formic acid or acetic acid, most preferably formic acid. The value of x can vary across a wide range, as is disclosed in these patents, and the same values apply in this invention.

Aluminium sulphate is a well-known and readily-available raw material and any of the commercial grades are suitable for use in this invention, for example the so-called "12%" and "17%" grades (referring to the theoretical weight percentage of aluminium oxide present).

The alkanolamine for use in this invention may be selected from any such material known to the art. The preferred alkanolamines are diethanolamine, triethanolamine and methyldiethanolamine. A mixture of two or more such materials may be used.

The weight proportions of the components which are combined to form the accelerating admixtures according to the invention are

| component | widest range | preferred range |
|---|---|---|
| formic acid | 1–10 | 6–8 |
| aluminium hydroxide | 1–30 | 16–18 |
| aluminium sulphate | 30–60 | 35–55 |
| alkanolamine | 0.1–12 | 0.5–8.0 | the remainder to 100% being water. The preferred formic acid is quoted here, but the same ranges apply to the other $C_1$–$C_6$ alkanoic acids.

With regard to the alkanolamines, the "widest range" given corresponds to the extremes of the different alkanolamines. The proportions of the various alkanolamines vary substantially. For example, the actual "widest ranges" for the three preferred materials are

| | |
|---|---|
| diethanolamine | 1–12% |
| triethanolamine | 0.1–4% |
| methyldiethanolamine | 1–8% |

However, the skilled person can readily ascertain what works and the "preferred range" is valid for all alkanolamines.

In an especially preferred embodiment of the invention, the admixture may additionally contain ferric sulphate, to the extent of from 0. 1–1.0% by weight of cement. The addition of this material produces a noticeable improvement in performance.

The admixture according to the invention may be manufactured by any convenient means. The order of addition of components is not critical. Thus, for example, it is possible and permissible first to react the formic acid and the aluminium hydroxide to form products of the type described in the abovementioned DD 226 344, and then to add the other components thereto. The reaction is carried out at elevated temperature, no higher than 90°–95° C. Alternatively, the aluminium hydroxide may be added last, to a heated mixture of the other components. This is a preferred method.

The admixture of the present invention may be used in an art-recognised manner with shotcrete. The invention therefore provides a process of coating a substrate with concrete by preparing a sprayable concrete mix and spraying this mix on to the substrate through a nozzle, there being supplied to the mix at the nozzle an accelerating admixture as hereinabove described. The admixture is provided to the nozzle as an aqueous solution or suspension at typically 50–60% solids by weight of the suspension, and so that the concrete receives from 0.5 to 15% by weight of admixture (solids on cement). The actual figure used will vary, depending on the type of cement and the mix design, but the provision of a suitable quantity is well within the skill of the art.

The invention therefore additionally provides a method of applying a layer of concrete to a substrate by spraying it through a nozzle, wherein there is added at the nozzle an accelerating amount of an accelerating admixture as hereinabove described.

The admixtures of the invention bring about unusually fast setting in comparison with other known alkali-free accelerators.

The invention further provides a layer of hardened concrete applied by spraying to a substrate via a nozzle, hardening having been accelerated by the addition at the nozzle of an accelerating amount of an accelerating admixture as hereinabove described.

The invention is now illustrated with reference to the following non-limiting examples in which all parts are expressed by weight.

PREPARATION OF ACCELERATING ADMIXTURE ACCORDING TO THE INVENTION

The composition is as follows

| | |
|---|---|
| water | 26 parts |
| formic acid | 8 parts |
| aluminium hydroxide | 18 parts |
| aluminium sulphate (17% grade) | 42 parts |
| diethanolamine (DEA) | 6 parts |

Water, formic acid and aluminium sulphate are mixed and heated to 50° C. At this point, DEA is added slowly with stirring. This is followed by the addition of aluminium hydroxide, again with stirring. Stirring is continued and the temperature is raised to 85° C. and held there until a clear liquid is formed.

The accelerating admixture thus prepared is tested in cement paste and mortar against two high-performance commercially-available alkali-free accelerators.

Two different types of Portland cement are used, Siggenthal Normo 4 CEM I 42.5 (hereinafter "Type A") and Schwenk CEM I 42.5 (hereinafter "Type B").

Mortar Test

The mortar was made according to the European Standard EN 196-1 formulation, that is

| | |
|---|---|
| cement | 450 parts |
| sand | 1350 parts |
| water | 189 parts | this giving a water/cement (w/c) ratio of 0.42.

To samples of the mortar composition are added the accelerating admixture prepared as hereinabove described (hereinafter "Type I") and two commercial alkali-free accelerators, these being MEYCO (trade mark) SA 160 ex MBT (Schweiz) AG, Switzerland (hereinafter "Type II")

F100 ex Giulini Chemie GmbH, Germany (hereinafter "Type III")

These are used in a concentration of 5% (solids by weight of cement). There is additionally added 1.5% (weight solids on cement) of "Rheobuild" (trade mark) 1000 ex MBT (Schweiz) AG, a BNS-type water reducer. In this form the mortar has a flow of 17 cm as measured by German Industrial Standard DIN 18555.

The mortar is subjected to a setting test using Vicat needles according to European Standard EN 196, part 3. The results are shown in the following table.

| | Cement type | Accelerator type | | |
|---|---|---|---|---|
| | | I | II | III |
| Initial setting (min) | Type A | 1 | 9.5 | 2 |
| | Type B | 0.5 | 3 | 0.5 |
| Time to 1 mm penetration (min) | Type A | 3 | 18 | 6.5 |
| | Type B | 2 | 17 | 2 |
| Final setting (min) | Type A | 4.5 | 30 | 13 |
| | Type B | 2.5 | 20 | 3 |

The admixture according to the invention performs better than both accelerators.

Paste Test

The pastes have a w/c ratio of 0.27 and samples are dosed with 5% (solids on cement) of accelerators. The pastes additionally contain 1% (solids on cement) "Rheobuild" 1000.

The setting of the pastes is tested as per the mortar samples, and the results are shown in the following table.

| | Cement type | Accelerator type | | |
|---|---|---|---|---|
| | | I | II | III |
| Initial setting (min) | Type A | 2 | | 12 |
| | Type B | 0.5 | 4 | 3 |
| Final setting (min) | Type A | 17 | 17 | 17 |
| | Type B | 3 | 16 | 13 |

Again, it can be seen that the overall performance of the accelerating admixture according to the invention is appreciably superior to the commercially-acceptable compositions.

What is claimed is:

1. An accelerating admixture for a sprayed concrete composition, comprising:
   (a) the reaction product of aluminum hydroxide with an organic acid;
   (b) aluminum sulphate; and,
   (c) at least one alkanolamine.

2. An accelerating admixture according to claim 1, wherein the organic acid is a $C_1$–$C_6$ alkanoic acid.

3. An accelerating admixture according to claim 2 wherein the organic acid is formic acid or acetic acid.

4. An accelerating admixture according to claim 3 wherein the organic acid is formic acid.

5. An accelerating admixture according to claim 1, wherein the alkanolamine is selected from the group consisting of diethanolamine, triethanolamine and methyldiethanolamine.

6. An accelerating admixture according to claim 2, wherein the alkanolamine is selected from the group consisting of diethanolamine, triethanolamine and methyldiethanolamine.

7. An aqueous accelerating admixture according to claim 1 which comprises:
   1–10% wt. of formic acid,
   1–30% wt. aluminum hydroxide,
   30–60% wt. aluminum sulphate,
   0.1–12% wt. alkanolamine.

8. A process for preparing an accelerating admixture for use with a sprayable concrete composition which process comprises: forming an admixture alkanolamine, aluminum sulphate and organic acid to water, heating said admixture, and subsequently adding aluminum hydroxide to said admixture.

9. A process of coating a substrate with a sprayable concrete mixture, wherein the sprayable concrete mixture includes the accelerating admixture according to claim 1.

10. A process of applying a layer of concrete to a substrate by spraying it through a nozzle, wherein there is added at the nozle an accelerating amount of an accelerating admixture according to claim 1.

11. An aqueous accelerating admixture according to claim 7 which comprises:

6–8% wt. of formic acid,

16–18% wt. aluminum hydroxide,

35–55% wt. aluminum sulphate, 0.5–8.0% wt. alkanolamine.

12. The accelerating admixture according to claim 6, wherein the amount of alkanolamine is 1–12% wt. diethanolamine, 0.1–4% wt. triethanolamine and 1–8% wt. methyldiethanolamine, based on the total weight of the admixture.

* * * * *